United States Patent
Decrop et al.

(10) Patent No.: US 12,405,827 B2
(45) Date of Patent: Sep. 2, 2025

(54) COGNITIVE ALLOCATION OF SPECIALIZED HARDWARE RESOURCES

(71) Applicant: International Business Machines Corporation, Armonk, NY (US)

(72) Inventors: Clement Decrop, Arlington, VA (US); Abhishek Malvankar, White Plains, NY (US); John M. Ganci, Jr., Raleigh, NC (US); Thomas Jefferson Sandridge, Tampa, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 662 days.

(21) Appl. No.: 17/570,659

(22) Filed: Jan. 7, 2022

(65) Prior Publication Data
US 2023/0221992 A1    Jul. 13, 2023

(51) Int. Cl.
*G06F 9/50*    (2006.01)
*G06F 9/48*    (2006.01)
(Continued)

(52) U.S. Cl.
CPC .......... *G06F 9/5027* (2013.01); *G06F 9/4881* (2013.01); *G06F 16/242* (2019.01);
(Continued)

(58) Field of Classification Search
None
See application file for complete search history.

(56) References Cited

U.S. PATENT DOCUMENTS 8,818,922 B2    8/2014    Chen et al.
10,002,402 B2    6/2018    Liu et al.
(Continued)

FOREIGN PATENT DOCUMENTS

CN    106663224 A    5/2017
CN    109298898 A    2/2019
(Continued)

OTHER PUBLICATIONS

International Searching Authority, PCT/CN2023/070963, Mar. 14, 2023.
(Continued)

*Primary Examiner* — Adam Lee
(74) *Attorney, Agent, or Firm* — Garg Law Firm, PLLC; Rakesh Garg; Michael O'Keefe

(57) ABSTRACT

An embodiment includes tokenizing a code segment generated by an integrated development environment responsive to user input, the tokenizing resulting in a tokenized code segment. The embodiment generates a search query by analyzing the tokenized code segment using a trained neural network. The embodiment executes a querying process that searches a knowledge base using the search query for a hardware requirement associated with the code segment, and detects a search result that conveys the hardware requirement as including a specialized hardware resource. The embodiment generates a time allotment associated with execution of the code segment using a second trained neural network that predicts the time allotment based on the tokenized code segment. The embodiment issues an instruction associated with the code segment to a hardware scheduler causing the hardware scheduler to allocate the specialized hardware resource for an amount of time corresponding to the time allotment.

20 Claims, 9 Drawing Sheets

(51) Int. Cl.
  *G06F 16/242* (2019.01)
  *G06F 16/2455* (2019.01)
  *G06N 3/042* (2023.01)
  *G06N 3/045* (2023.01)
(52) U.S. Cl.
  CPC ......... *G06F 16/2455* (2019.01); *G06N 3/042* (2023.01); *G06N 3/045* (2023.01)

(56) References Cited

U.S. PATENT DOCUMENTS

| | | | |
|---|---|---|---|
| 10,719,903 B2 | 7/2020 | Artico et al. | |
| 10,929,161 B2 | 2/2021 | Koblents et al. | |
| 10,997,054 B1* | 5/2021 | Tripp | G06F 11/3604 |
| 2011/0145392 A1 | 6/2011 | Dawson et al. | |
| 2017/0220942 A1 | 8/2017 | Baldini Soares et al. | |
| 2018/0184412 A1* | 6/2018 | Youtz | H04W 72/51 |
| 2019/0034227 A1* | 1/2019 | Suman | G06F 9/4881 |
| 2019/0166019 A1* | 5/2019 | Jagadeesh | H04L 41/5054 |
| 2019/0179860 A1* | 6/2019 | Gizzi Giaimo | G06Q 30/02 |
| 2019/0303197 A1* | 10/2019 | Li | G06F 9/4887 |
| 2020/0019854 A1 | 1/2020 | Abraham et al. | |
| 2020/0250585 A1* | 8/2020 | Liu | G06N 20/00 |
| 2020/0334083 A1 | 10/2020 | Liu et al. | |
| 2021/0089360 A1 | 3/2021 | Wong et al. | |
| 2021/0096915 A1* | 4/2021 | Patel | G06F 16/24545 |
| 2021/0136178 A1* | 5/2021 | Casey | H04L 67/1021 |
| 2021/0303985 A1* | 9/2021 | Lakshmikantha | G06N 3/044 |
| 2022/0083375 A1* | 3/2022 | Zeng | G06F 9/4881 |
| 2022/0107837 A1* | 4/2022 | Youn | G06N 3/063 |
| 2022/0129316 A1* | 4/2022 | Sheoran | G06F 9/5083 |
| 2022/0206770 A1* | 6/2022 | Facory | G06F 8/451 |
| 2022/0206786 A1* | 6/2022 | Silva | G06F 8/36 |
| 2022/0350708 A1* | 11/2022 | Vishwakarma | G06F 11/1458 |
| 2023/0055415 A1* | 2/2023 | Desaulniers | G06F 11/3006 |
| 2023/0118846 A1* | 4/2023 | Ocon Cardenas | G06F 9/5005 718/104 |

FOREIGN PATENT DOCUMENTS

| | | |
|---|---|---|
| CN | 111415725 A | 7/2020 |
| CN | 112527495 A | 3/2021 |
| CN | 109213600 B | 4/2021 |
| CN | 112612613 A | 4/2021 |
| CN | 109902818 B | 5/2021 |
| CN | 109919310 B | 5/2021 |

OTHER PUBLICATIONS

Yang, et al., XLNet: Generalized Autoregressive Pretraining for Language Understanding, arXiv:1906.08237v2 [cs.CL], Jan. 2, 2020, 18 pages.

* cited by examiner

COGNITIVE ALLOCATION OF SPECIALIZED HARDWARE RESOURCES

BACKGROUND

The present invention relates generally to a method, system, and computer program product for data processing. More particularly, the present invention relates to a method, system, and computer program product for cognitive allocation of specialized hardware resources.

Cloud-based services provide for the use of remote computing capacity and storage capacity as a service to end users. Such services typically offer the use of a computing resource that utilizes a computing node or cluster of nodes that operate on a distributed communication network, with each computing resource including processing capability and memory. In some cases, the performance and capacity of available computing resources may vary, and end-users have the ability to request resources according to their particular implementation requirements. Some resources may also offer end-users the option of using "specialized" hardware, such as a Graphics Processing Unit (GPU), Tensor Processing Unit (TPU), Field-Programmable Gate Array (FPGA), or Application-Specific Integrated Circuit (ASIC) device. A user may request the use of computing resources that include specialized hardware if such resources are required by their application or workload.

SUMMARY

The illustrative embodiments provide for cognitive allocation of specialized hardware resources. An embodiment includes tokenizing a code segment generated by an integrated development environment responsive to user input, the tokenizing resulting in a tokenized code segment. The embodiment also includes generating a search query by analyzing the tokenized code segment using a first trained neural network. The embodiment also includes executing a querying process that searches a knowledge base using the search query for a hardware requirement associated with the code segment. The embodiment also includes detecting that a search result from the querying process conveys the hardware requirement as including a specialized hardware resource. The embodiment also includes generating a time allotment associated with execution of the code segment using a second trained neural network that predicts the time allotment based on the tokenized code segment. The embodiment also includes issuing an instruction associated with the code segment to a hardware scheduler causing the hardware scheduler to allocate the specialized hardware resource for an amount of time corresponding to the time allotment. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
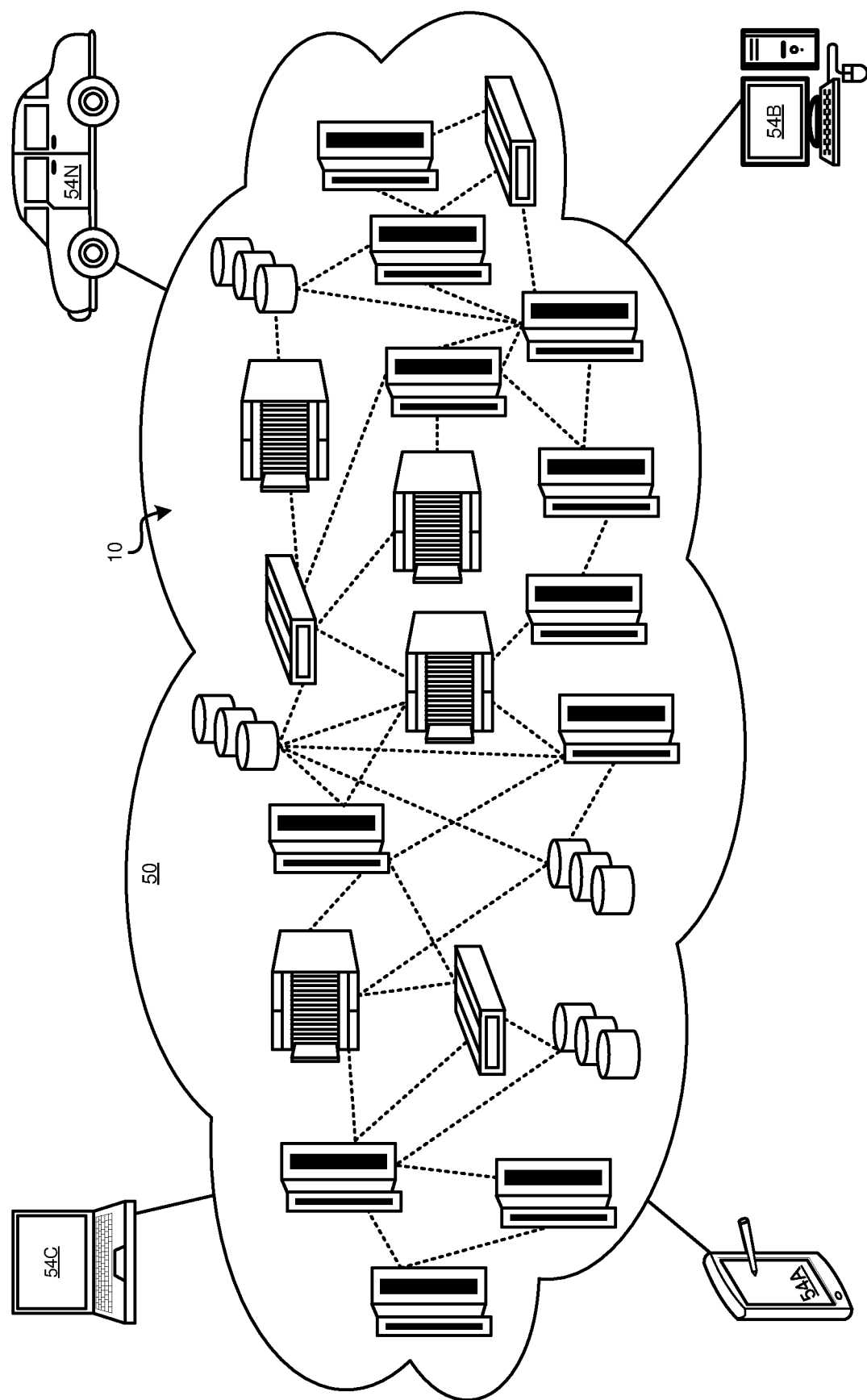
FIG. 1 depicts a cloud computing environment according to an embodiment of the present invention.

In many cloud systems, a limited number of configuration parameters are available to the user for adjusting a configuration of a node cluster. For example, a user may only be able to select different nodes having different performance and memory capacities and may include "specialized" hardware. A "specialized" hardware, as referred to herein, is any specialized processor other than a general-purpose CPU. Examples of specialized hardware include GPUs, TPUs, FPGAs, ASICs, or other specialized processors.

A user may request the use of computing resources that include specialized hardware if such resources are required by their application or workload. However, the use of specialized hardware typically incurs additional expense that the user incurs, and the cost is also typically based on the length of time that the resource is allocated to that user. This resource allocation does not mean that the hardware is in active use. Instead, it means that the allocated hardware is locked to a particular user and available for only that user. While this hardware availability is a convenience for the user, it also may incur unnecessary expense while the hardware is allocated but not in active use. This situation also represents inefficient use of hardware resources that are inactive but locked and unavailable for use by other users. This leads to a problem also for the cloud provider, in that the cloud provider may need to purchase and implement additional hardware to meet demand despite having inactive hardware that is present but locked.

Aspects of the present disclosure address the deficiencies described above by providing mechanisms (e.g., systems, methods, machine-readable media, etc.) that to enable allocation of computing resources, including specialized hardware, that is more closely tied to actual usage of such hardware. As a simplified example, a particular application may include several modules, but only one of those modules benefits from the use of a GPU. Rather than allocating the GPU for the entire duration that the application is active, embodiments disclosed herein include a cognitive allocation mechanism that allocates the GPU only for the duration of the particular module that uses the GPU, and releases the GPU for use by other users when that particular module is not active.

In some embodiments, a cognitive allocation mechanism analyzes source code context in a user task with help of natural language processing (NLP). In some such embodiments, the mechanism uses a custom knowledge base to correctly identify a task from the analysis of the source code. The custom knowledge base allows the mechanism to make predictions as to whether an upcoming task will be executed that needs specialized hardware. In some embodiments, the mechanism captures context between different tasks written by the user in a development environment to isolate blocks of code that use specialized hardware and for which specialized hardware should be allocated. As a result, disclosed embodiments allow for improved efficiency by maximize the usage or sharing of computing resources, including specialized hardware, among different tasks and users.

In an illustrative embodiment, a cognitive allocation mechanism tokenizes a code segment generated by an integrated development environment responsive to user input. In some such embodiments, the cognitive allocation mechanism divides source code into code segments that each have a predetermined number of characters of code, and then tokenizes the resulting code segments. In some such embodiments, the cognitive allocation mechanism detects a predetermined number of characters of code have been inputted by the user to the integrated development environment, forms a code segment from the detected predetermined number of characters of code, and then tokenizes the formed code segment.

In an illustrative embodiment, a cognitive allocation mechanism generates a search query by analyzing the tokenized code segment using a first trained neural network. In some such embodiments, the first trained neural network is included in an encoder network of a deep autoencoder that further comprises a decoder network. In some such embodiments, the encoder network comprises a plurality of input nodes and the decoder network comprises a plurality of output nodes.

In some embodiments, the search query comprises a segment of source code, and the querying process comprises a database search for a block of source code containing the segment of source code. In some such embodiments, the database search comprises searching blocks of source code associated with respective hardware labels. In some such embodiments, the hardware labels include indications of whether the respective associated blocks of source code utilize specialized hardware. In some embodiments, the specialized hardware is a GPU, TPU, FPGA, ASIC, or other specialized processor.

In an illustrative embodiment, a cognitive allocation mechanism executes the querying process that searches a knowledge base using the search query for a hardware requirement associated with the code segment. In some such embodiments, the cognitive allocation mechanism detects that a search result from the querying process associated with a particular code segment conveys a hardware requirement for that code segment as including a specialized hardware resource.

In an illustrative embodiment, a cognitive allocation mechanism generates a time allotment associated with execution of the code segment using a second trained neural network that predicts the time allotment based on the tokenized code segment. In some such embodiments, the cognitive allocation mechanism trains the second trained neural network to predict the time allotments using historical data indicative of processing times associated with segments of source code.

In an illustrative embodiment, a cognitive allocation mechanism issues an instruction associated with the code segment to a hardware scheduler causing the hardware scheduler to allocate the specialized hardware resource to the user. In some such embodiments, the cognitive allocation mechanism issues an instruction causing the hardware scheduler to allocate the specialized hardware resource for an amount of time corresponding to the time allotment.

In an illustrative embodiment, a cognitive allocation mechanism updates the knowledge base to include the code segment. In some such embodiments, the cognitive allocation mechanism issues, responsive to the updating of the knowledge base, an instruction for a subject matter expert to review the code segment added to the knowledge base.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
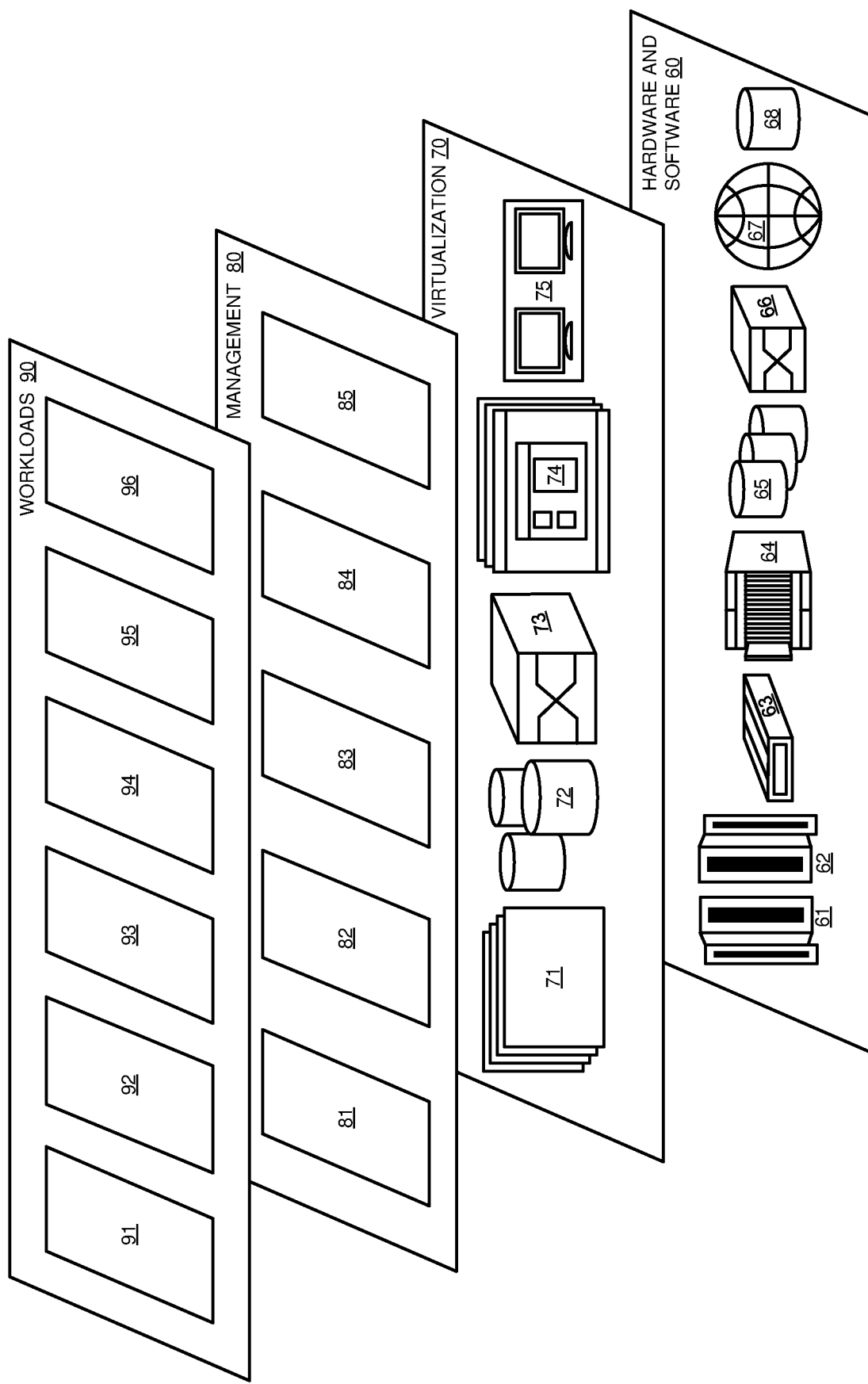
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and in the context of the illustrated embodiments of the present disclosure, various workloads and functions 96 for In an illustrative embodiment, a cognitive allocation processing. In addition, workloads and functions 96 for cognitive allocation processing may include such operations such as data analysis and machine learning (e.g., artificial intelligence, natural language processing, etc.), as described herein. In some embodiments, the workloads and functions 96 for cognitive allocation processing also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
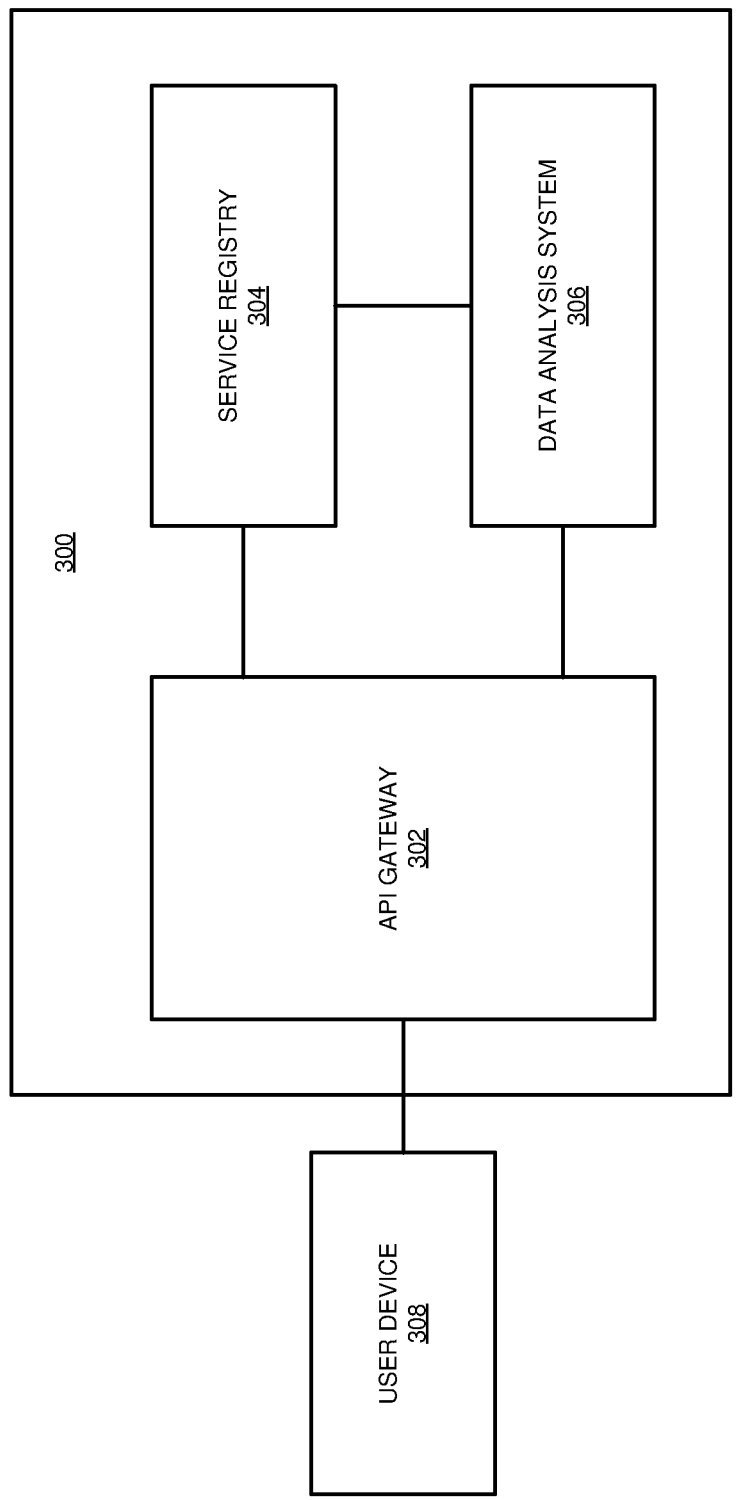
FIG. 3 depicts a block diagram of an example service infrastructure that includes a data analysis system in accordance with an illustrative embodiment.

With reference to FIG. 3, this figure depicts a block diagram of an example service infrastructure 300 that includes a data analysis system 306 in accordance with an illustrative embodiment. In some embodiments, the data analysis system 306 is deployed in workloads layer 90 of FIG. 2. By way of example, in some embodiments, data analysis system 306 is implemented as machine learning processing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated data analysis system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and use any suitable communication protocols such as Wi-Fi, Bluetooth, etc. Service infrastructure 300 may be built on the basis of cloud computing. API gateway 302 provides access to client applications like data analysis system 306. API gateway 302 receives service requests issued by client applications, and creates service lookup requests based on service requests. As a non-limiting example, in an embodiment, the user device 308 is a personal computer running an Integrated Development Environment (IDE) that communicates with the data analysis system 306 via the API gateway 302. Alternatively, the user device 308 is a personal computer running a client application, such as a web browser, that allows the user to interact with an IDE running in the service infrastructure 300, for example as part of the data analysis system 306.

In the illustrated embodiment, service infrastructure 300 includes a service registry 304. In some embodiments, service registry 304 looks up service instances of data analysis system 306 in response to a service lookup request such as one from API gateway 302 in response to a service request from user device 308. For example, in some embodiments, the service registry 304 looks up service instances of data analysis system 306 in response to requests from the user device 308.

In some embodiments, the service infrastructure 300 includes one or more instances of the data analysis system 306. In some such embodiments, each of the multiple instances of the data analysis system 306 run independently on multiple computing systems. In some such embodiments, data analysis system 306, as well as other service instances of data analysis system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

Figure 4:
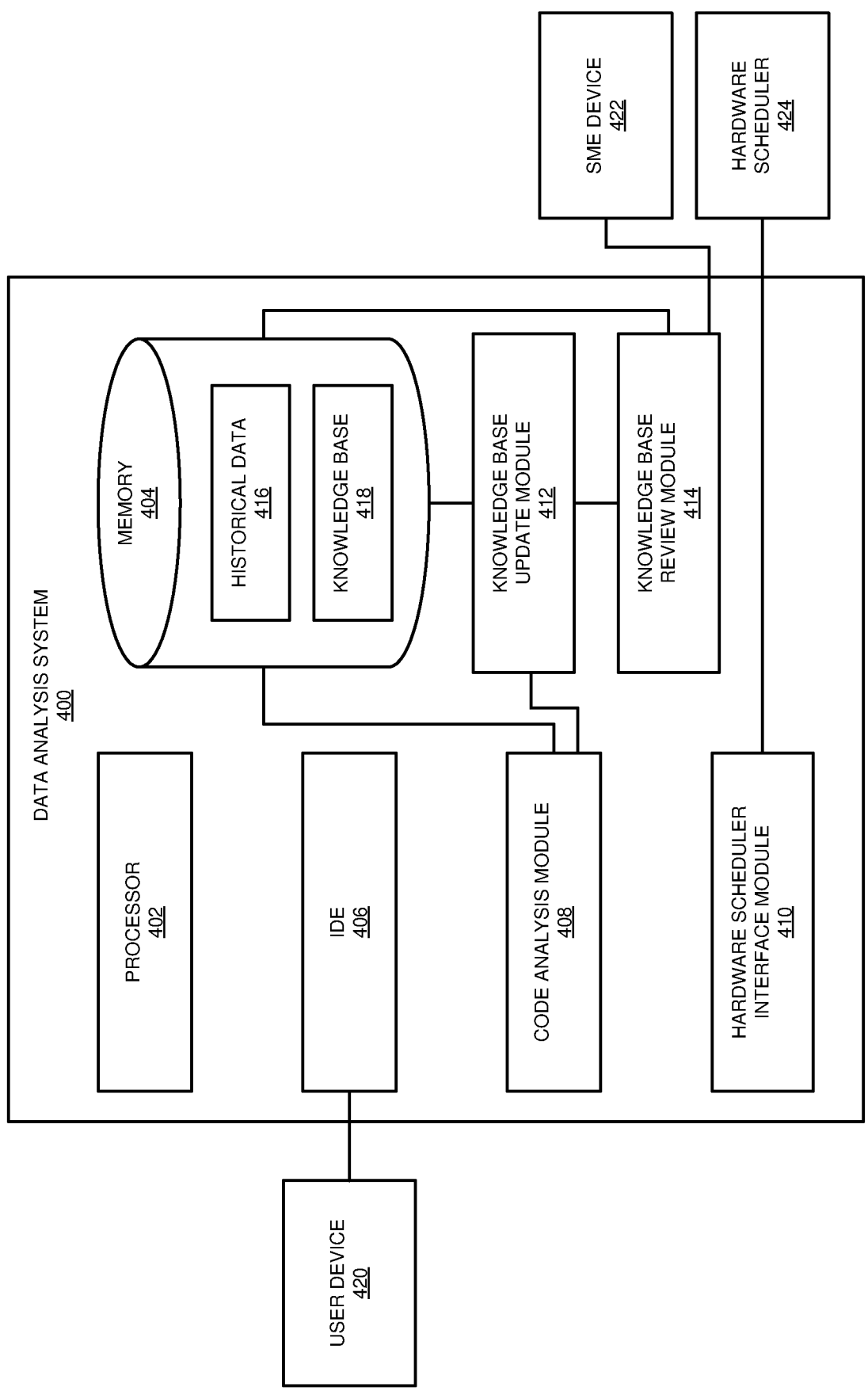
FIG. 4 depicts a block diagram of an example data analysis system in accordance with an illustrative embodiment.

With reference to FIG. 4, this figure depicts a block diagram of an example data analysis system 400 in accordance with an illustrative embodiment. In a particular embodiment, the data analysis system 400 is an example of the workloads and functions 96 for classifier processing of FIG. 1.

In the illustrated embodiment, the data analysis system 400 is an example of a cognitive allocation mechanism that enables allocation of computing resources, including specialized hardware, that is closely tied to actual usage of such hardware. The data analysis system 400 includes a processor 402, memory 404, an IDE 406, a code analysis module 408, a hardware scheduler interface module 410, a knowledge base update module 412, and a knowledge base review module 414. In alternative embodiments, the data analysis system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The IDE 406 communicates with a user device 420 and allows a user to use the IDE 406 remotely via the user device 420. The processing unit ("processor") 402 performs various computational and data processing tasks, runs the IDE 406, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein. The memory 404 also stores historical data 416 and a knowledge base 418.

In some embodiments, the IDE 406 includes a user interface that allows a user to input source code. In some embodiments, the code analysis module 408 analyzes the source code for context with help of NLP. In some such embodiments, the code analysis module 408 uses a custom knowledge base 418 to correctly identify a task from the analysis of the source code. The custom knowledge base 418 allows the code analysis module 408 to make predictions as to whether an upcoming task will be executed that needs specialized hardware. In some embodiments, the code analysis module 408 captures context between different tasks written by to the IDE 406 to isolate blocks of code that use specialized hardware and for which specialized hardware should be allocated. As a result, disclosed embodiments allow for improved efficiency by maximize the usage or sharing of computing resources, including specialized hardware, among different tasks and users.

In the illustrated embodiment, the code analysis module 408 tokenizes a code segment generated by the IDE 406 responsive to user input. In some such embodiments, the code analysis module 408 divides source code into code segments that each have a predetermined number of characters of code, and then tokenizes the resulting code segments. In some such embodiments, the code analysis module 408 detects a predetermined number of characters of code have been inputted by the user to the IDE 406, forms a code segment from the detected predetermined number of characters of code, and then tokenizes the formed code segment.

In the illustrated embodiment, the code analysis module 408 executes a querying process that searches the knowledge base 418 for a hardware requirement associated with the code segment. In some such embodiments, code analysis module 408 detects that a search result from the querying process conveys a hardware requirement for that code segment as including a specialized hardware resource. In some embodiments, the code analysis module 408 communicates this specialized hardware resource need to the hardware scheduler interface module 410.

In the illustrated embodiment, the hardware scheduler interface module 410 responds to the communication from the code analysis module 408 by generating a time allotment associated with execution of the code segment that requires the specialized hardware. In some embodiments, the hardware scheduler interface module 410 uses a trained neural network to predict the time allotment based on the tokenized code segment. In some such embodiments, hardware scheduler interface module 410 trains the neural network to predict the time allotments using historical data 416, which includes training data indicative of processing times associated with segments of source code.

In the illustrated embodiment, the hardware scheduler interface module 410 issues an instruction associated with the code segment to a hardware scheduler 424, causing the hardware scheduler 424 to allocate the specialized hardware resource to the user. In some such embodiments, the hardware scheduler interface module 410 issues an instruction causing the hardware scheduler 424 to allocate the specialized hardware resource for an amount of time corresponding to the time allotment determined by the hardware scheduler interface module 410.

In the illustrated embodiment, a knowledge base update module 412 updates the knowledge base 418 to include the code segment and associated hardware requirement. In some such embodiments, the knowledge base update module 412 communicates a notification of the update to the knowledge base 418 to a knowledge base review module 414. In some such embodiments, the knowledge base review module 414 issues, responsive to the updating of the knowledge base 418, an instruction for a subject matter expert (SME) to review the code segment added to the knowledge base 418.

Figure 5:
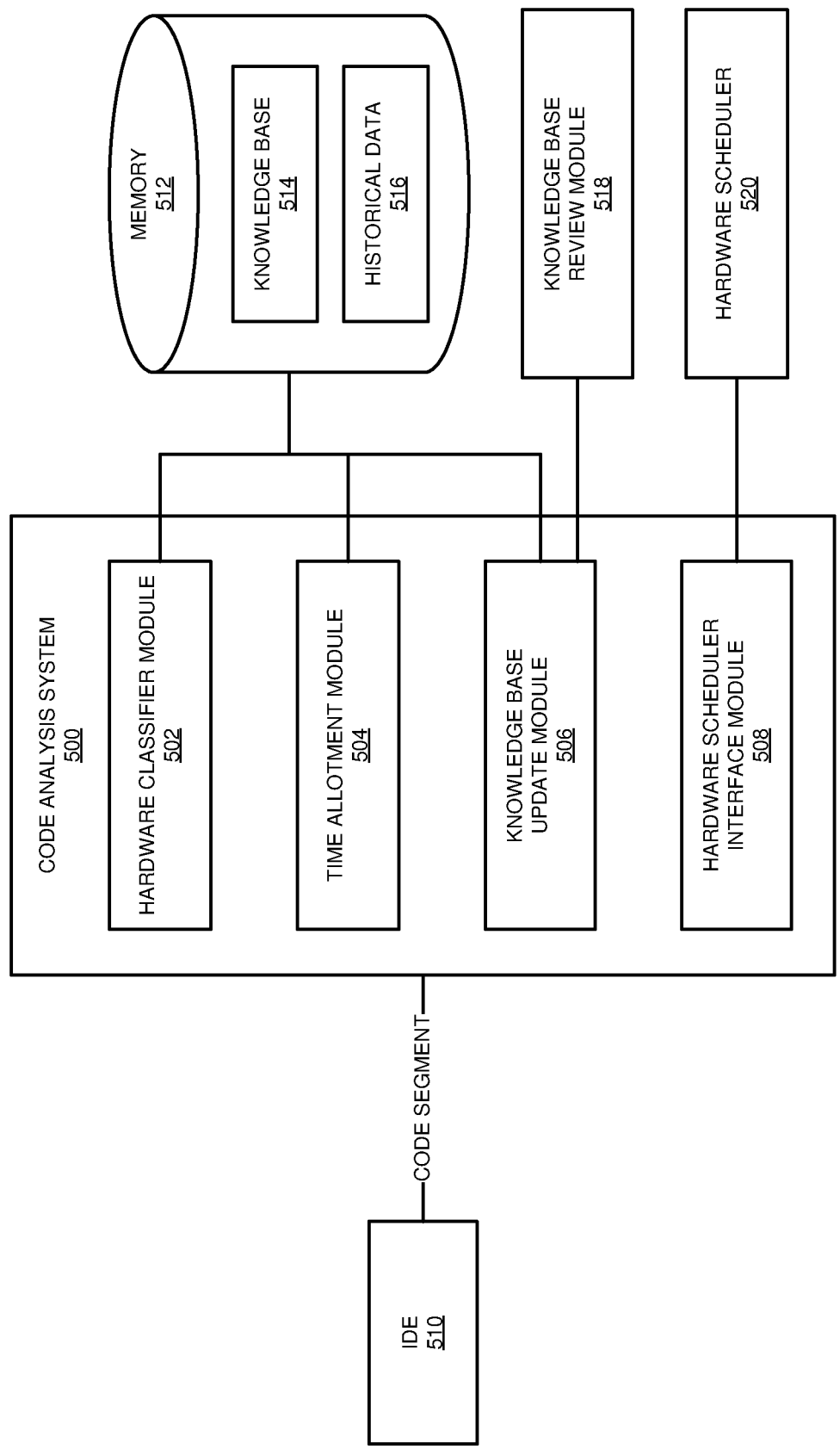
FIG. 5 depicts a block diagram of an example code analysis system in accordance with an illustrative embodiment.

With reference to FIG. 5, this figure depicts a block diagram of an example code analysis system 500 in accordance with an illustrative embodiment. In a particular embodiment, the code analysis system 500 is an example of the code analysis module 408 of FIG. 4. In alternative embodiments, the code analysis system 500 may be a stand-alone application that communicates with external elements that are included in the embodiment of the data analysis system 400 shown in FIG. 4, such as IDE 510, memory 512 storing a knowledge base 514 and historical data 514, and a knowledge base review module 518. While the knowledge base 514 and historical data 516 are shown in a single memory 512, alternatively the knowledge base 514 and historical data 516 may be in different memories and may be distributed among any number of memories.

In some embodiments, the code analysis system 500 includes a hardware classifier module 502, a time allotment module 504, a knowledge base update module 506, and a hardware scheduler interface module 508. In alternative embodiments, the code analysis module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the code analysis module 500 receives code segments from an IDE 510. In some embodiments, the IDE 510 is an example of IDE 406 of FIG. 4 or operates on a user device, such as user device 308 of FIG. 3.

In some embodiments, the hardware classifier module 502 analyzes the source code for context with help of NLP. In some such embodiments, the hardware classifier module 502 is in communication with memory 512. In some embodiments, the memory 512 comprises one or more computer readable storage media with program instructions collectively stored on the one or more computer readable storage media, with the program instructions being executable by one or more processors to cause the one or more processors to perform operations described herein. The memory 512 also stores historical data 514 and a knowledge base 514.

In some embodiments, the hardware classifier module 502 uses the custom knowledge base 514 to correctly identify a task from the analysis of the source code. The custom knowledge base 514 allows the hardware classifier module 502 to make predictions as to whether an upcoming task will be executed that needs specialized hardware. In some embodiments, the hardware classifier module 502 captures context between different tasks written to the IDE 510 to isolate blocks of code that use specialized hardware and for which specialized hardware should be allocated. As a result, disclosed embodiments allow for improved efficiency by maximize the usage or sharing of computing resources, including specialized hardware, among different tasks and users.

In the illustrated embodiment, the hardware classifier module 502 tokenizes a code segment generated by the IDE 510 responsive to user input. In some such embodiments, the hardware classifier module 502 divides source code into code segments that each have a predetermined number of characters of code, and then tokenizes the resulting code segments. In some such embodiments, the hardware classifier module 502 detects a predetermined number of characters of code have been inputted by the user to the IDE 510, forms a code segment from the detected predetermined number of characters of code, and then tokenizes the formed code segment.

In the illustrated embodiment, the hardware classifier module 502 executes a querying process that searches the knowledge base 514 for a hardware requirement associated with the code segment. In some such embodiments, hardware classifier module 502 detects that a search result from the querying process conveys a hardware requirement for that code segment as including a specialized hardware resource. In some embodiments, the hardware classifier module 502 communicates this specialized hardware resource need to the time allotment module 504 and to the hardware scheduler interface module 508.

In the illustrated embodiment, the time allotment module 504 responds to the communication from the hardware classifier module 502 by generating a time allotment associated with execution of the code segment that requires the specialized hardware. In some embodiments, the time allotment module 504 uses a trained neural network to predict the time allotment based on the tokenized code segment. In some such embodiments, the time allotment module 504 trains the neural network to predict the time allotments using historical data 516, which includes training data indicative of processing times associated with segments of source code. In some embodiments, the time allotment module 504 communicates the predicted time allotment to the hardware scheduler interface module 508.

In the illustrated embodiment, the hardware scheduler interface module 508 issues, in response to receiving the time allotment from the time allotment module 504, an instruction associated with the code segment to a hardware scheduler 520, causing the hardware scheduler 520 to allocate the specialized hardware resource to the user. In some such embodiments, the hardware scheduler interface module 508 issues an instruction causing the hardware scheduler 520 to allocate the specialized hardware resource for an amount of time corresponding to the time allotment determined by the hardware scheduler interface module 508.

In the illustrated embodiment, a knowledge base update module 506 updates the knowledge base 516 to include the code segment and associated hardware requirement. In some such embodiments, the knowledge base update module 506 communicates a notification of the update to the knowledge base 516 to a knowledge base review module 518. In some such embodiments, the knowledge base review module 518 may be associated with an SME, who will review the code segment added to the knowledge base 516 and predicted hardware requirements for accuracy.

Figure 6:
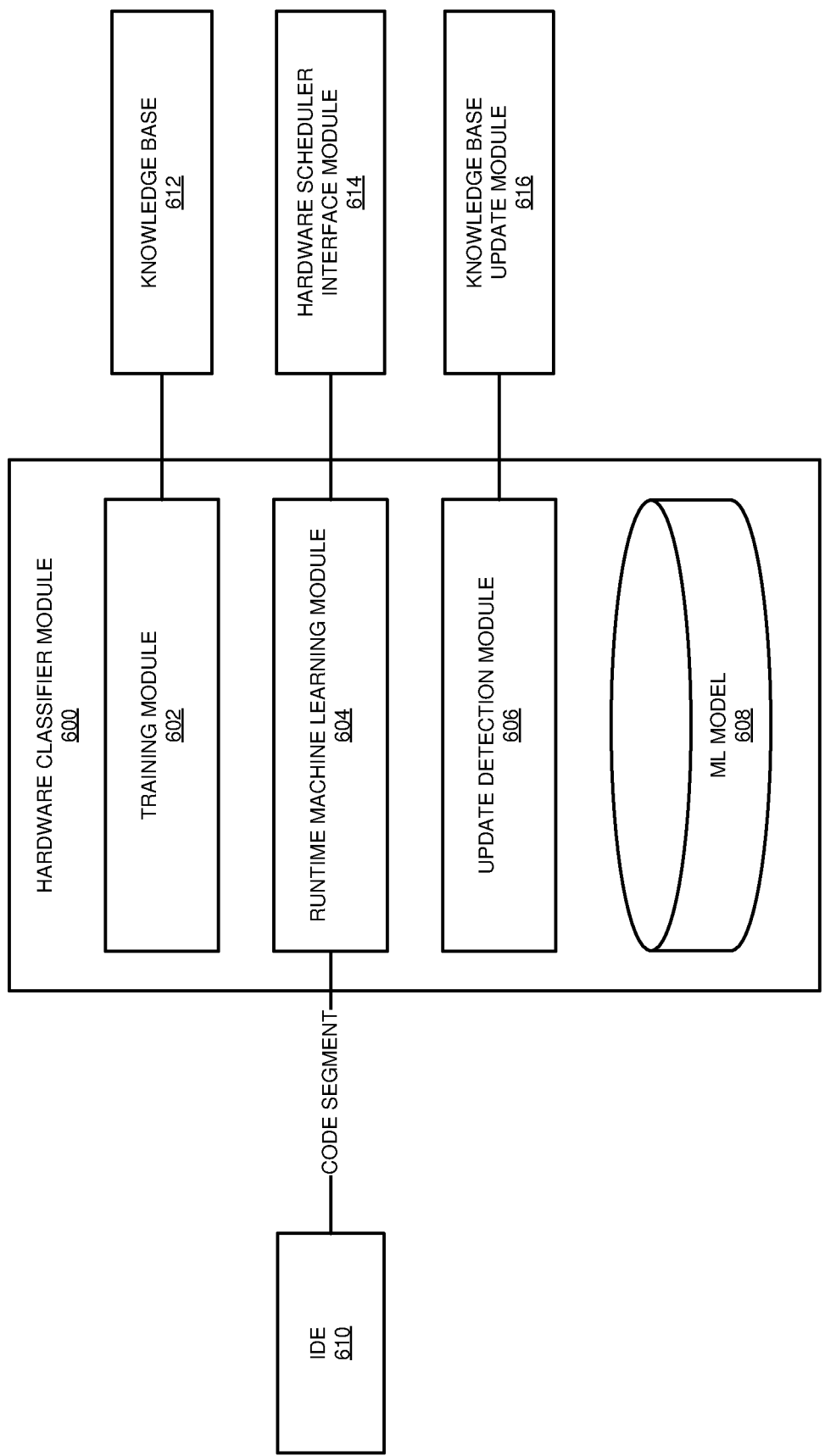
FIG. 6 depicts a block diagram of an example hardware classifier module in accordance with an illustrative embodiment.

With reference to FIG. 6, this figure depicts a block diagram of an example hardware classifier module 600 in accordance with an illustrative embodiment. In a particular embodiment, the hardware classifier module 600 is an example of the hardware classifier module 502 of FIG. 5.

In some embodiments, the hardware classifier module 600 includes a training module 602, a runtime machine learning module 604, an update detection module 606, and a memory storing a machine learning model 608. In alternative embodiments, the hardware classifier module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. The metadata definition module 606 describes the format and dataset structure of the metadata for the model and for the training data, such as XML tags, to facilitate comparison of the two metadata datasets.

In the illustrated embodiment, the training module 602 provides for communication with the knowledge base 612 and, in some embodiments, also to various other sources of training data. In some embodiments, the knowledge base 612 includes source code, knowledge base (KB) concepts, labels indicating classification as specialized or non-specialized, and reviewer comments, such as shown in Table 1:

TABLE 1

| Code | KB Concepts | Label | Reviewer Comment |
|---|---|---|---|
| import boto as s3<br>for i in range(1000):<br>s3.getObject('bucket_name', 'data') | object_store | non-specialized | Approved |
| import tensorflow as tf<br>checkpoint_callback = ModelCheckpoint(<br>  filepath, monitor='val_accuracy',<br>verbose=1,<br>  save_best_only=False,<br>save_weights_only=False,<br>  save_frequency=1) | tensorflow | specialized | changes to model checkpointing |
| import discovery as was<br>classify_samples #a list to classify the samples.<br>for i in classify_samples:<br>instance.classify | discovery | non-specialized | access to service to classify images |

In some embodiments, the training module 602 uses the code and labels as training data for training a machine learning (ML) model 608 to identify code as requiring specialized or non-specialized hardware. In some embodiments, the training module 602 also performs preprocessing of training data, which may include known preprocessing techniques such as format conversion, amplitude normalization, phase shifting, frequency weighting, blanking, summation, and/or filtering.

In the illustrated embodiment, the runtime machine learning module 604 receives code segments from an IDE 610. In some embodiments, the runtime machine learning module 604 analyzes the source code for context using the ML model 608 as trained by the training module 602. In some embodiments, the ML model 608 includes NLP to allow the runtime machine learning module 604 to parse and recognize source code.

In some embodiments, the runtime machine learning module 604 uses the custom knowledge base 612 to correctly identify a task from the analysis of the source code. The custom knowledge base 612 allows the runtime machine learning module 604 to make predictions as to whether an upcoming task will be executed that needs specialized hardware. In some embodiments, the runtime machine learning module 604 captures context between different tasks written to the IDE 610 to isolate blocks of code that use specialized hardware and for which specialized hardware should be allocated. As a result, disclosed embodiments allow for improved efficiency by maximize the usage or sharing of computing resources, including specialized hardware, among different tasks and users.

In the illustrated embodiment, the runtime machine learning module 604 tokenizes a code segment generated by the IDE 610 responsive to user input. In some such embodiments, the runtime machine learning module 604 divides source code into code segments that each have a predetermined number of characters of code, and then tokenizes the resulting code segments. In some such embodiments, the runtime machine learning module 604 detects a predetermined number of characters of code have been inputted by the user to the IDE 610, forms a code segment from the detected predetermined number of characters of code, and then tokenizes the formed code segment.

In the illustrated embodiment, the runtime machine learning module 604 generates a search query by analyzing the tokenized code segment using a trained neural network of the trained ML model 608. In some such embodiments, the trained neural network is included in an encoder network of a deep autoencoder that further comprises a decoder network. In some such embodiments, the encoder network comprises a plurality of input nodes and the decoder network comprises a plurality of output nodes. In some embodiments, the runtime machine learning module 604 uses a Bidirectional Encoder Representations from Transformers (BERT) ML model 608.

In some embodiments, the search query comprises a segment of source code, and the querying process comprises a database search of knowledge base 612 for a block of source code containing the segment of source code. In some such embodiments, the database search comprises searching blocks of source code associated with respective hardware labels. In some such embodiments, the hardware labels include indications of whether the respective associated blocks of source code utilize specialized hardware. In some embodiments, the specialized hardware is a GPU, TPU, FPGA, ASIC, or other specialized processor.

In the illustrated embodiment, the runtime machine learning module 604 executes a querying process that searches the knowledge base 612 for a hardware requirement associated with the code segment. In some such embodiments, runtime machine learning module 604 detects that a search result from the querying process conveys a hardware requirement for that code segment as including a specialized hardware resource. In some embodiments, the runtime machine learning module 604 communicates this specialized hardware resource need to the hardware scheduler interface module 614 and to the update detection module 606.

In the illustrated embodiment, the update detection module 606 determines if the source code just processed by the runtime machine learning module 604 is in the knowledge base 612. If not, then the update detection module 606 notifies the knowledge base update module 616 to add the source code to the knowledge base 612. In response, the knowledge base update module 616 updates the knowledge base 612 to include the code segment and associated hardware requirement. In some such embodiments, the knowledge base update module 616 communicates a notification of the update to the knowledge base 612 to an SME for review. The SME may then will review the code segment added to the knowledge base 612 and predicted hardware requirements for accuracy.

Figure 7:
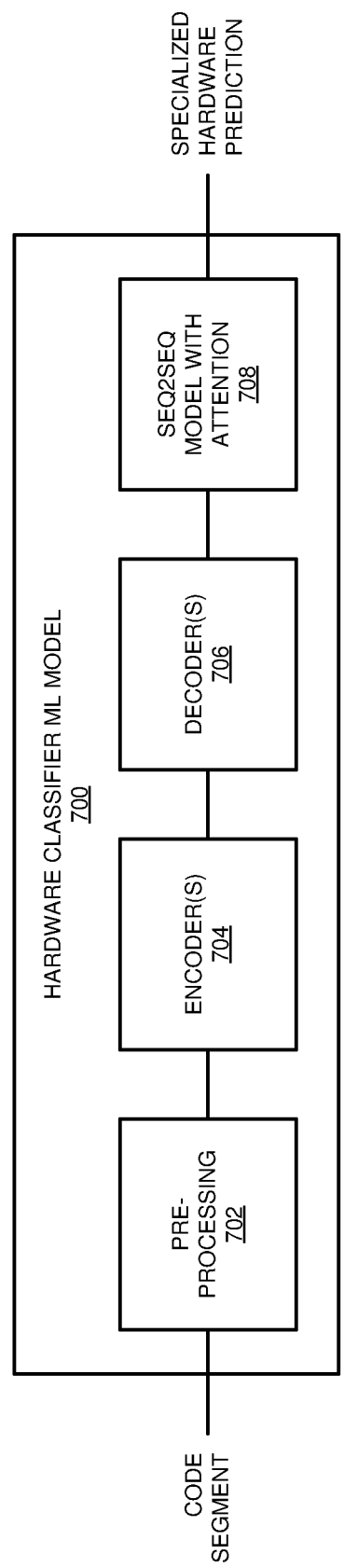
FIG. 7 depicts a block diagram of an example hardware classifier ML model in accordance with an illustrative embodiment.

With reference to FIG. 7, this figure depicts a block diagram of an example hardware classifier ML model 700 in accordance with an illustrative embodiment. In a particular embodiment, the hardware classifier ML model 700 is an example of the ML model 608 of FIG. 6.

In some embodiments, the ML model 700 includes preprocessing 702, one or more encoders 704, one or more decoders 706, and a seq2seq model with attention 708. In alternative embodiments, the ML model 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications. The metadata definition module 606 describes the format and dataset structure of the metadata for the model and for the training data, such as XML tags, to facilitate comparison of the two metadata datasets.

In some embodiments, the ML model 700 has a transformer neural network architecture that includes a neural-network based encoder and a neural-network based decoder. In some embodiments, the ML model 700 includes a plurality of encoders and has a BERT architecture.

In the illustrated embodiment, the ML model 700 includes preprocessing module 702 that tokenizes code segments from an IDE (e.g., IDE 610 of FIG. 6). In some embodiments, each received code segment is a predetermined size, for example 128, 256, or 512 characters. In some embodiments, the preprocessing module 702 performs additional preprocessing of each received code segment, which may include known preprocessing techniques such as format conversion, amplitude normalization, phase shifting, frequency weighting, blanking, summation, and/or filtering.

The ML model 700 analyzes the source code for context. In the illustrated embodiment, the ML model 700 has a transformer architecture that includes one or more encoders 704 and one or more decoders 706. The encoder(s) 704 take the code segment and generate embeddings for every word of the code segment simultaneously. These embeddings are vectors that encapsulate the meanings of the words. Similar words have closer numbers in their vectors. The decoder(s) 706 takes these embeddings from the encoder(s) 704 and process each word together with previously-processed words of the code segment until the end of the code segment is reached. The decoder(s) 706 output an input vector that includes context information for the words of the code segment, and provide the input vector as input for a summarization ML technique, such as a Seq2Seq model with attention module 708. The Seq2Seq model with attention module 708 is trained using data from a knowledge base, such as knowledge base 612, to generate a search query based on the input vector from the decoder(s) 706. This search query is then sent to a knowledge base, such as knowledge base 612. In some such embodiments, the ML model 700 detects that a search result from the querying process conveys a hardware requirement for that code segment as either requiring or not requiring a specialized hardware resource. In some embodiments, the ML model 700 outputs this result as a specialized hardware prediction.

Figure 8:
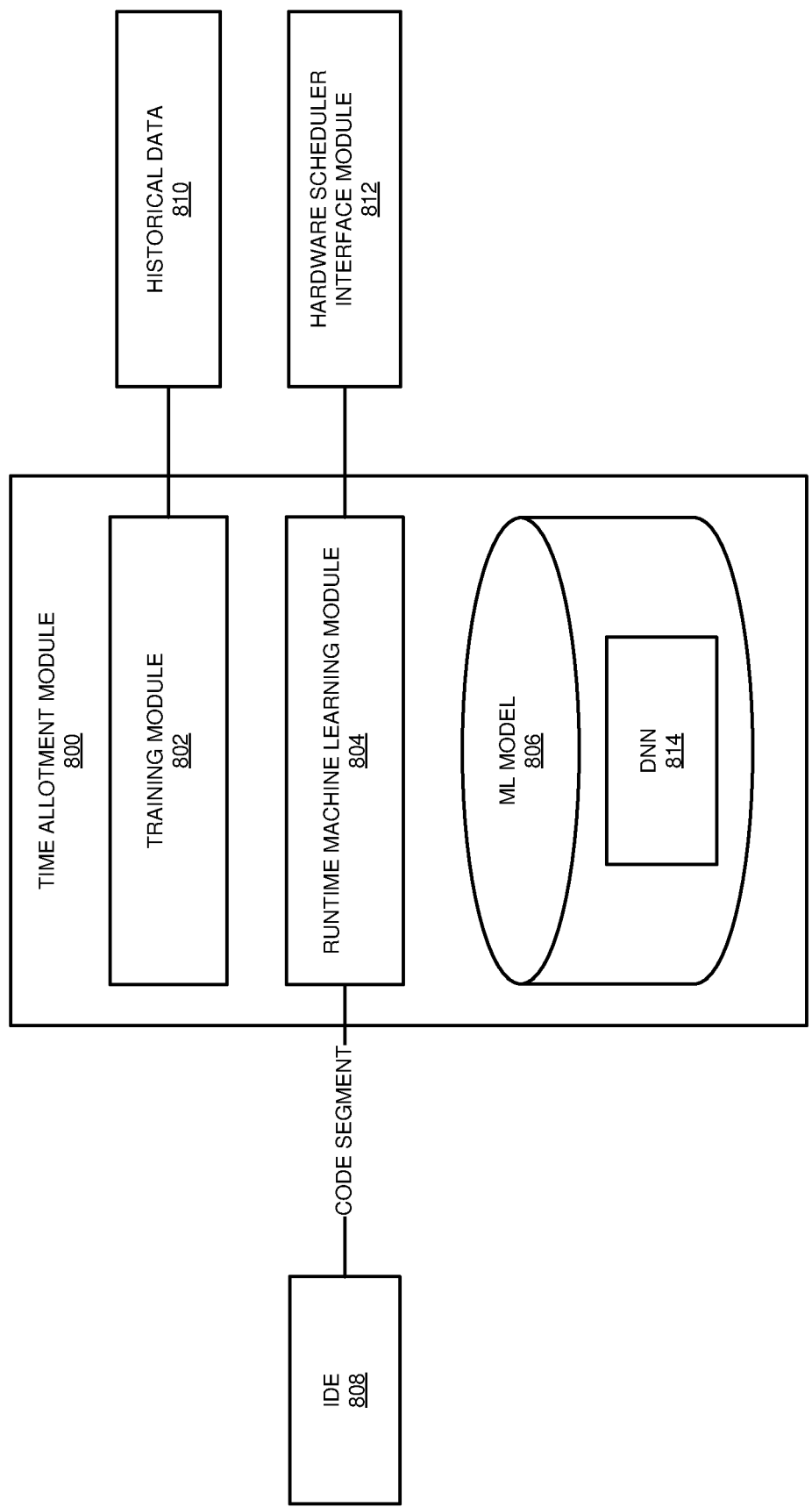
FIG. 8 depicts a block diagram of an example time allotment module in accordance with an illustrative embodiment.

With reference to FIG. 8, this figure depicts a block diagram of an example time allotment module 800 in accordance with an illustrative embodiment. In a particular embodiment, the time allotment module 800 is an example of the time allotment module 504 of FIG. 5.

In some embodiments, the time allotment module 800 includes a training module 802, a runtime machine learning module 804 (or more simply referred to as machine learning module 804), and a ML model 806 that includes a deep neural network 814. In some embodiments, the time allotment module 800 includes training validation functionality for automatically and autonomously evaluating the accuracy of the ML model 806 once trained by the training module 802.

In the illustrated embodiment, In some embodiments, the hardware classifier module 502 communicates this specialized hardware resource need to the time allotment module 504 and to the hardware scheduler interface module 508.

In the illustrated embodiment, the time allotment module 800 responds to the communications from a hardware classifier module (e.g., hardware classifier module 502) by generating a time allotment associated with execution of the code segment from an IDE (e.g., IDE 510) that requires the specialized hardware. In some embodiments, the time allotment module 800 includes a training module 802 that trains a ML model 806 using historical data 810 and known neural network training techniques. In some such embodiments, the historical data 810 includes historical data associating code segments and respective time requirements.

In some such embodiments, the runtime machine learning module 804 then uses the trained ML model 806 to predict the time allotments for specialized hardware based on input code segments. In some embodiments, the runtime machine learning module 804 communicates the predicted time allotment to a hardware scheduler interface module 812, which is an example of the hardware scheduler interface module 508 of FIG. 5.

Figure 9:
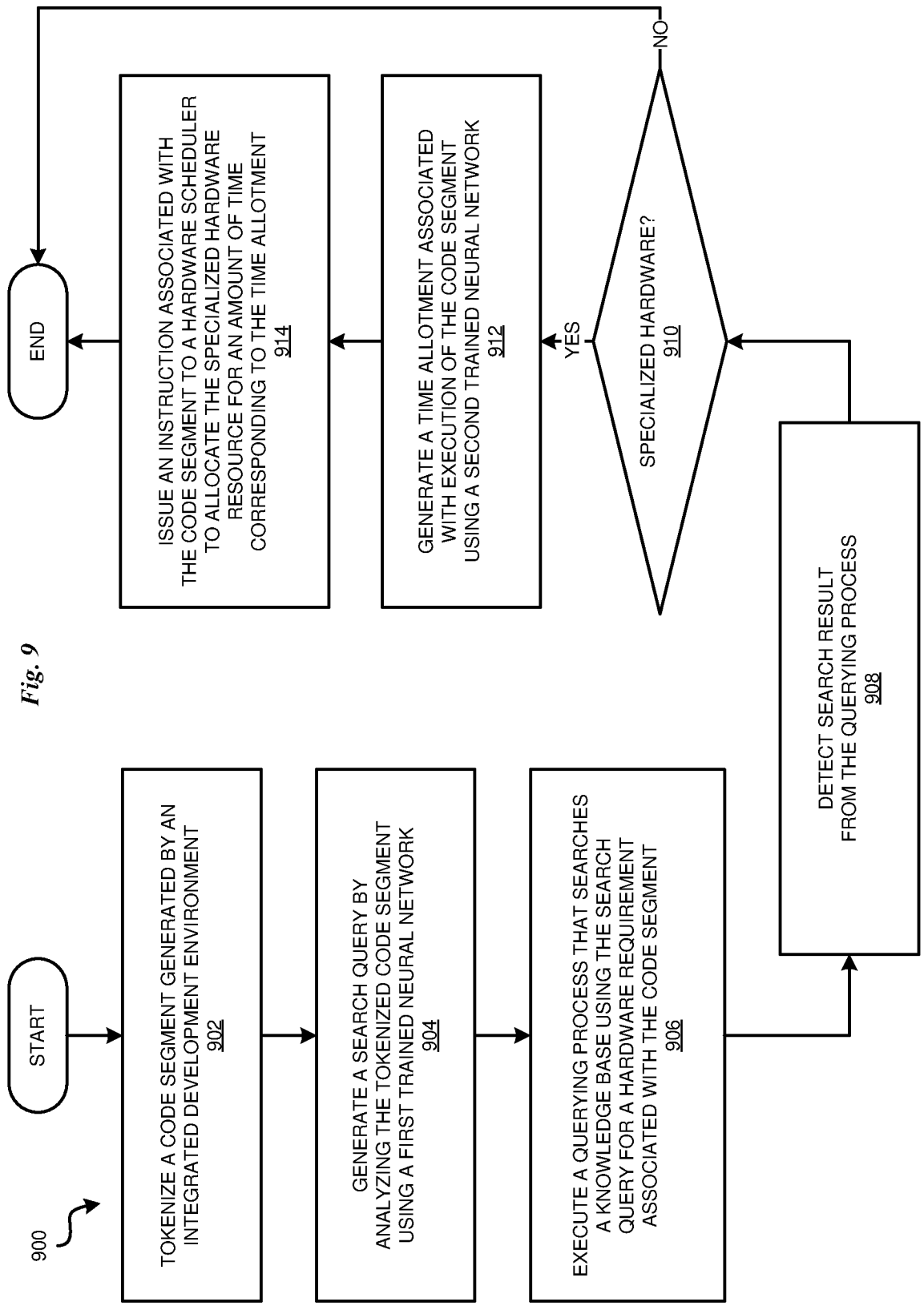
FIG. 9 depicts a flowchart of an example process for cognitive allocation of specialized hardware resources in accordance with an illustrative embodiment.

With reference to FIG. 9, this figure depicts a flowchart of an example process 900 for cognitive allocation of specialized hardware resources in accordance with an illustrative embodiment. In a particular embodiment, the data analysis system 306 or data analysis system 400 carries out the process 900.

In an embodiment, at block 902, the process tokenizes a code segment generated by an integrated development environment responsive to user input. In some embodiments, the tokenizing results in a tokenized code segment. Next, at block 904, the process generates a search query by analyzing the tokenized code segment using a first trained neural network. Next, at block 906, the process executes a querying process that searches a knowledge base using the search query for a hardware requirement associated with the code segment. Next, at block 908, the process detects that a search result from the querying process conveys a hardware requirement as either including or not including a specialized hardware resource. At block 910, the process continues to block 912 if specialized hardware is required; otherwise, if specialized hardware is not required, the process ends. At block 912, the process generates a time allotment associated with execution of the code segment using a second trained neural network that predicts the time allotment based on the tokenized code segment. Next, at block 914, the process issues an instruction associated with the code segment to a hardware scheduler, causing the hardware scheduler to allocate the specialized hardware resource for an amount of time corresponding to the time allotment.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
receiving source code input by a user to a user interface of an integrated development environment (IDE);
sending a tokenized segment of the source code to at least one of a code analysis module and a runtime machine learning module;
sending a search query comprising a hardware requirement associated with the tokenized code segment to a knowledge base, wherein the search query is generated based on an analysis of the tokenized code segment by a first trained neural network;
obtaining a result from the search query indicating a prediction of a specialized hardware resource associated with the hardware requirement;
issuing an instruction associated with the tokenized code segment to a hardware scheduler, wherein the instruction causes the hardware scheduler to allocate the predicted specialized hardware resource to the tokenized code segment during a predicted time allotment; and
executing the tokenized code segment using the allocated specialized hardware resource during the predicted time allotment, wherein the predicted time allotment is generated using a second trained neural network and is based on the tokenized code segment.

2. The method of claim 1, wherein the first trained neural network is included in an encoder network of a deep autoencoder that further comprises a decoder network, the encoder network comprises a plurality of input nodes, and the decoder network comprises a plurality of output nodes.

3. The method of claim 1, wherein the tokenized code segment includes a predetermined number of characters of code inputted by the user to the IDE.

4. The method of claim 1, wherein at least one of the first trained neural network and the second trained neural network are trained using historical data.

5. The method of claim 4, wherein the knowledge base comprises a block of source code containing the tokenized segment of source code.

6. The method of claim 5, wherein the knowledge base comprises blocks of source code associated with respective hardware labels, and wherein the hardware labels include indications of whether the respective associated blocks of source code utilize specialized hardware resources.

7. The method of claim 6, wherein the specialized hardware is selected from a group consisting of Graphics Processing Units, Tensor Processing Units, Field-Programmable Gate Arrays, and Application-Specific Integrated Circuits.

8. The method of claim 4, wherein the historical data is indicative of processing times associated with different tokenized segments of source code.

9. The method of claim 1, further comprising when the knowledge base does not contain the tokenized code segment, updating the knowledge base to include the tokenized code segment.

10. The method of claim 9, further comprising issuing, responsive to the updating of the knowledge base, an instruction for a subject matter expert to review the tokenized code segment added to the knowledge base.

11. A computer program product, the computer program product comprising one or more computer readable storage media and program instructions collectively stored on the one or more computer readable storage media, the program instructions executable by one or more processors to cause the one or more processors to execute operations comprising:
   receiving source code input by a user to a user interface of an integrated development environment (IDE);
   sending a tokenized segment of the source code to at least one of a code analysis module and a runtime machine learning module;
   sending a search query comprising a hardware requirement associated with the tokenized code segment to a knowledge base, wherein the search query is generated based on an analysis of the tokenized code segment by a first trained neural network;
   obtaining a result from the search query indicating a prediction of a specialized hardware resource associated with the hardware requirement;
   issuing an instruction associated with the tokenized code segment to a hardware scheduler, wherein the instruction causes the hardware scheduler to allocate the predicted specialized hardware resource to the tokenized code segment during a predicted time allotment; and
   executing the tokenized code segment using the allocated specialized hardware resource during the predicted time allotment, wherein the predicted time allotment is generated using a second trained neural network and is based on the tokenized code segment.

12. The computer program product of claim 11, wherein the stored program instructions are further stored on the one or more computer readable storage media in a computer readable storage device in a first data processing system, and wherein the stored program instructions are transferred over a network from the first data processing system to a second data processing system remote from the first data processing system.

13. The computer program product of claim 11, wherein the stored program instructions are further stored on the one or more computer readable storage media in a computer readable storage device in a server data processing system, and wherein the stored program instructions are downloaded from the server data processing system in response to receiving a request over a network to a data processing system remote from the server data processing system for use in a computer readable storage device of the remote data processing system, the operations further comprising:
   metering use of the downloaded program instructions associated with the request; and
   generating an invoice based on the metered use.

14. The computer program product of claim 11, wherein the first trained neural network is included in an encoder network of a deep autoencoder that further comprises a decoder network, the encoder network comprises a plurality of input nodes, and the decoder network comprises a plurality of output nodes.

15. The computer program product of claim 11, wherein the tokenized code segment includes a predetermined number of characters of code inputted by the user to the IDE.

16. The computer program product of claim 11, wherein at least one of the first trained neural network and the second trained neural network are trained using historical data.

17. A computer system comprising one or more processors and one or more computer readable storage media, and program instructions collectively stored on the one or more computer readable storage media, the program instructions executable by the one or more processors to cause the one or more processors to execute operations comprising:
   receiving source code input by a user to a user interface of an integrated development environment (IDE);
   sending a tokenized segment of the source code to at least one of a code analysis module and a runtime machine learning module;
   sending a search query comprising a hardware requirement associated with the tokenized code segment to a knowledge base, wherein the search query is generated based on an analysis of the tokenized code segment by a first trained neural network;
   obtaining a result from the search query indicating a prediction of a specialized hardware resource associated with the hardware requirement;
   issuing an instruction associated with the tokenized code segment to a hardware scheduler, wherein the instruction causes the hardware scheduler to allocate the predicted specialized hardware resource to the tokenized code segment during a predicted time allotment; and
   executing the tokenized code segment using the allocated specialized hardware resource during the predicted time allotment, wherein the predicted time allotment is generated using a second trained neural network and is based on the tokenized code segment.

18. The computer system of claim 17, wherein the first trained neural network is included in an encoder network of a deep autoencoder that further comprises a decoder network, the encoder network comprises a plurality of input nodes, and the decoder network comprises a plurality of output nodes.

19. The computer system of claim 17, wherein the tokenized code segment includes a predetermined number of characters of code inputted by the user to the IDE.

20. The computer system of claim 17, wherein at least one of the first trained neural network and the second trained neural network are trained using historical data.

\* \* \* \* \*